United States Patent
Maeckel et al.

[19]

[11] Patent Number: 6,031,701
[45] Date of Patent: Feb. 29, 2000

[54] DEVICE AND METHOD FOR OVERVOLTAGE PROTECTION

[75] Inventors: Rainer Maeckel, Königswinter; Peter Hille, Darmstadt, both of Germany

[73] Assignee: Daimler-Chrysler AG, Stuttgart, Germany

[21] Appl. No.: 09/092,028

[22] Filed: Jun. 5, 1998

Related U.S. Application Data

[63] Continuation-in-part of application No. 08/953,245, Oct. 17, 1997.

[30] Foreign Application Priority Data

Mar. 12, 1997 [DE] Germany .......................... 197 10 073

[51] Int. Cl.[7] ...................................................... H02H 9/00
[52] U.S. Cl. ................................ 361/52; 361/18; 361/21; 361/115
[58] Field of Search .................... 361/1, 18, 20, 361/21, 56, 91, 115, 52

[56] References Cited

U.S. PATENT DOCUMENTS

| | | | |
|---|---|---|---|
| 3,581,150 | 5/1971 | Kirk et al. | 361/21 |
| 3,931,546 | 1/1976 | Jakobs et al. | 361/21 |
| 4,275,344 | 6/1981 | Mori et al. | 361/21 |
| 5,245,500 | 9/1993 | Rozman | 361/56 |

FOREIGN PATENT DOCUMENTS

| | | | |
|---|---|---|---|
| 019 464 A2 | 12/1980 | European Pat. Off. . | |
| 3605 543 A1 | 8/1987 | Germany | H02H 9/04 |
| 36 14 578 A1 | 11/1987 | Germany | H02H 9/04 |
| 39 15 198 A1 | 11/1990 | Germany | H02H 9/04 |
| 40 39 404 C2 | 6/1992 | Germany | H02P 9/10 |
| 44 29 715 C1 | 5/1996 | Germany | H02H 9/04 |
| 452 666 | 5/1968 | Switzerland | H02H 9/04 |
| WO 92/17930 | 10/1992 | WIPO | H02J 7/16 |

OTHER PUBLICATIONS

DIN (German Industrial Standard) 40 839 Part 1, Oct. 1992.

*Primary Examiner*—Stephen W Jackson
*Attorney, Agent, or Firm*—Venable; George Spencer; Norman N. Kunitz

[57] ABSTRACT

An overvoltage protective arrangement to protect an electrical installation against overvoltages, which installation has an onboard power supply system fed by an electrical D.C. generator (9) and electrical devices connected thereto. The overvoltage protective arrangement is provided with a limiting device whose threshold value is above the rated generator voltage.

27 Claims, 5 Drawing Sheets

DEVICE AND METHOD FOR OVERVOLTAGE PROTECTION

CROSS REFERENCE TO RELATED APPLICATIONS

This application claims the priority of German application Ser. No. DE 197 10 073.2, filed Mar. 12, 1997, which is incorporated herein by reference. This application is a Continuation-in-part of applicant's co-pending U.S. patent application Ser. No. 08/953,245, filed Oct. 17, 1997.

BACKGROUND OF THE INVENTION

The invention relates to an overvoltage protective device to protect electrical onboard power supply systems, in particular, onboard vehicle power supply systems, against overvoltages as well as to a method for operating the overvoltage protective device according to the preambles of the independent claims.

Electrical devices in mobile units, particularly in vehicles, are usually supplied by an onboard power supply system which, in turn, is powered by an electrical generator. When the generator supplies little or no energy to the onboard power supply system, the onboard power supply system receives the necessary energy from an energy store, e. g., a battery. When the generator delivers more energy than is needed in the onboard power supply system or in the loads, the energy store serves as a buffer for this energy. Overvoltages in the onboard power supply system may occur if there is a failure of the energy store acting as a buffer, e. g., due to corrosion of the terminals or in the event of a cable break between the energy store and the generator and the like.

A further possible cause for the occurrence of overvoltages in the onboard power supply system is present if, for example, inductive electrical loads such as, e. g., fan motors or seat adjustments, are switched away from the onboard power supply system while the vehicle is in operation. The load shedding causes an overvoltage in the onboard power supply system with, at times, very high values. Details are cited in a number of references, for which, e. g., DIN (German Industrial Standard) 40839, Part I, is cited as representative.

Such voltage peaks cause considerable problems in the electrical units. Devices, particularly control devices, for the internal combustion engine, for the transmission or for the antilock system, are usually constructed from discrete and/or integrated semiconductor switches which can malfunction as a result of overvoltages and/or can even be destroyed. A measure for the occurrence of irreversible damage is the breakdown voltage of the semiconductors that are used, which is normally between approximately 50 V and 60 V in automotive applications.

German Patent No. 40 39 404 C2 discloses an overvoltage protective device wherein a controllable switch arrangement short-circuits the generator if an overvoltage occurs. The switch arrangement is provided with an integrated MOSFET switch and offers the option of predetermining switching thresholds via comparators. Via this arrangement, an attempt is made to minimize the overvoltage in the onboard power supply system by influencing the exciter winding of the generator. But even this arrangement cannot reliably prevent the occurrence of a voltage pulse, even at a low height. Particularly a possible undesirable voltage rise due to feedback on the part of the loads in the power supply system cannot be compensated.

In conventional onboard power supply systems, so-called suppressor or limiter diodes are frequently used in the electronic devices or, centrally, on the generator. The suppressor diodes are intended to limit the possible overvoltages to a value that is harmless for the semiconductor concerned. But the terminal voltage of the suppressor diodes depends so greatly on ambient influences, particularly on the temperature and the internal resistance, that a wide tolerance range of the supply voltage of the onboard power supply system must be accepted.

Because of the possible voltage peaks that must be considered, semiconductor switches with breakdown voltages of 50 volt and more are applied in 12 V onboard power supply systems that are used at present. Integrated semiconductor components that meet these requirements are expensive and have a large chip surface because of the technology. A large chip surface, however, translates into a high price for an integrated semiconductor component. If it is intended to use higher onboard voltages, this size and cost problem intensifies because of the rising breakdown voltages.

German Patent Application DE 39 15 198 A1, on which the present invention is based, discloses a protective device for the protection of electrical equipment against transient overvoltages, particularly lightning stroke. The overvoltage protective device has a limiting device whose limiting threshold is above the rated voltage of a voltage supply system. A power branch having a voltage detecting or sensing unit and an actuating unit is connected in parallel to the voltage supply system. In the power branch there are arranged two resistors connected in series with respect to one another, of which one can be actuated when the limiting threshold is exceeded for the purpose of a resistance reduction. During this process, the power that appears in the event of a malfunction is absorbed in the power branch. In the event of a malfunction, a very high power is converted [also: turned over ?] in the power branch because excess energy is produced in the voltage supply system when the voltage is high. For this reason, the disclosed protective device is only suitable to protect a circuit against very short voltage pulses.

However, if an overvoltage protective device is used in an onboard vehicle power supply system, conflicting demands must be met with respect to a high precision of the control system as well as to low costs of the components used for the control system with which excess power can be carried away if an overvoltage occurs. Overvoltages within a specific range must be tolerated, but if this range is exceeded, a protective circuit must respond reliably. This protective circuit, however, must not respond too early under any circumstances, namely within the permissible overvoltage range.

It is the object of the invention to provide a method and an arrangement for the overvoltage protection of an onboard vehicle power supply system having an energy store in order to protect the onboard vehicle power supply system reliably and with a high precision and, at the same time, economically against overvoltages in the onboard power supply system.

SUMMARY OF THE INVENTION

The above object generally is achieved according to the resent invention by an overvoltage protective device to protect an electrical installation from overvoltage, which installation has an onboard power supply system including an electrical generator and a generator voltage regulator for controlling the output voltage of the generator and having power and reference leads fed by the electrical generator and electrical devices connected thereto, which device comprises: a basic unit connected in parallel with the onboard power supply system at the output side of the generator, with the unit having at least one power circuit branch connected in parallel with the onboard power supply system across the power and reference leads, a voltage detecting unit and an actuating unit, with the power circuit branch including at least two resistance components, with at least one of the resistance components being controllable to reduce its resistance, and with the voltage detecting unit and the actuating unit including circuit means for monitoring the voltage of the power supply and for controlling the at least one controllable resistance component to reduce its resistance and fixedly set the power supply voltage to the limiting threshold value $V_{BMXA}$ when the power supply voltage exceeds the limiting threshold value ($V_{Bmax}$), which value is above the rated voltage of the system generator; and wherein the basic unit further includes a voltage feedback unit which is connected to said circuit means for emitting a control signal to the generator voltage regulator to cause the reduction of the generator excitation if an overvoltage is detected.

It is the special advantage of the invention that, with regard to the dielectric strength, the electrical components in an onboard power supply system must only be designed for small tolerances, so that in addition to the increased safety for the operation of the onboard power supply system, considerable cost savings are possible, at the same time, for the use of semiconductor elements in the onboard power supply system. The small tolerances are particularly advantageous for onboard power supply systems with relatively high voltages.

If an overvoltage occurs, the invention provides means which make it possible to control the voltage of the onboard power supply system to an upper permissible value and to keep it precisely at this value. In particular, a power branch is provided for this purpose wherein at least one resistor can be actuated for the purpose of reducing the resistance value. Furthermore, it is provided that the excitation of the generator is reduced rapidly if an overvoltage occurs. Therewith it can be prevented reliably that the voltage of the onboard power supply system rises beyond a fixed voltage threshold. Preferably, the upper permissible value is above the voltage of the onboard power supply system. This ensures that an energy store, in particular, a battery in the onboard power supply system, is loaded or even short-circuited by a premature response of the protective device, which represents a hazard in the vehicle that cannot be tolerated. Furthermore, the protective circuit is prevented from being overloaded if an overvoltage occurs.

Specifically, the voltage is controlled continuously if an overvoltage occurs. This is done by means of a special arrangement at the generator output which monitors the voltage value of the onboard power supply system voltage and checks it for the appearance of an overvoltage. In particular, if an overvoltage occurs during this process, the excitation of the generator is additionally reduced very quickly, preferably more than ten times faster than for the control of the onboard power supply system voltage during normal operation. During this process, the invention provides that the fast de-energizing or de-excitation of the generator in the event of a malfunction has priority over the usual control of the onboard power supply system voltage during normal operation, but preferably does not intervene in the control of the voltage of the onboard power supply system during normal operation. In the event of a malfunction, the overall load on the components in the power branch is only small. This rapid de-energizing of the generator is caused by an additional voltage feedback unit which only intervenes in the control of the onboard power supply system voltage if an overvoltage occurs.

Preferably, the upper permissible threshold value in the event of an overvoltage is kept constant across a wide temperature range, preferably between −20° C. to 85° C., particularly preferable between −40° C. to 125° C.

Preferably, the generator controller or regulator is modified such that means for control interventions during normal operation and control interventions in the event of an overvoltage are provided to be separate from one another. Preferably, the generator controller is modified such that an additional input for a signal of an additional voltage feedback unit is provided. The signals from their additional voltage feedback unit are forwarded in the event of an overvoltage and/or are processed by the generator controller so as to act at least indirectly on the excitation of the generator.

It is advantageous that, due to the feedback in the event of a malfunction, which is separate from the normal control operation, the generator controller can be designed such that the excitation of the generator is reduced with a markedly smaller time constant than is normally the case for the control to the rated voltage value. For this purpose, the generator controller as means which are suitable to reduce the excitation of the generator in less than 500 ms. Preferably these means are provided with at least one semiconductor switch and with a freewheeling diode.

In a further preferred embodiment, additional means are provided for limiting the excitation of the generator. Advantageously, the excitation winding of the generator can then be designed in such a manner that the times for the buildup and reduction of the excitation current that are obtained are as short as possible. If an overvoltage occurs, the occurring excess energy then is minimal and the electronic components of the circuit in the power branch are loaded as little as possible. Preferably, these means have at least one current control for the excitation current. The current control is preferably controlled through a voltage control which controls to the rated generator voltage, but limits the desired current value in the process. Preferably, the desired value for the voltage of the onboard power supply system and a threshold value for the response of the overvoltage protective device are made available by the same reference unit. Especially preferred as reference unit is a precision voltage source.

It is useful to structurally and/or electrically integrate the means for the rapid de-energizing of the generator into the generator controller. It is also useful to combine the generator controller and means for the overvoltage protection in a control device on the generator.

It is particularly advantageous that the invention does not have to primarily intervene in the exciter circuit, but rather limits the voltage in the onboard power supply system at the output of the generator. If an overvoltage occurs there, the invention provides that it is consumed in a power branch which has at least one nonlinear resistor.

It is particularly advantageous that overvoltages caused by electrical units within the power supply system are also limited in this manner so that a possible feedback does not result in an overvoltage. This increases the safety of the arrangement as a whole. The requirements with regard to the dielectric strength of components for the actuation of the loads in the onboard power supply system can be considerably lower without sacrificing safety. This is advantageous especially for voltage supply systems with a relatively high rated voltage, e. g., 42 V onboard power supply systems.

Furthermore, the invention offers the advantage that the use of semiconductor switches with high breakdown voltages can be dispensed with because voltage peaks are eliminated reliably. This, in turn, saves costs, especially for onboard vehicle power supply systems intended for voltages that are higher than in a conventional 12 V onboard power supply system, in particular in a 42 V onboard power supply system, because it is not necessary to use expensive high-voltage semiconductor components whose dielectric strength would otherwise have to be a multiple of the voltage of the onboard power supply system. Since the level of the dielectric strength of an integrated semiconductor component is usually coupled with a large chip surface of the semiconductor component, the chip surface can be made smaller as a result of the arrangement according to the invention and component costs can be saved.

It is a particular advantage that semiconductor switches with a lower breakdown voltage can be used not only on the generator but in all electrical devices in the onboard power supply system as a whole. This again implies the option of respectively minimizing the chip surface and thus the costs of the component concerned. The arrangement according to the invention is particularly advantageous for onboard power supply systems with a relatively high power supply system voltage.

A further advantage of the invention is that the tolerance range of the onboard power supply system voltage is reduced. Particularly favorable for the design and/or the operation of the electrical devices is the fact that the voltage in the onboard power supply system is controlled with great precision and the maximum permissible voltage value is exactly complied with. The necessary safety margins of the component parameters, which are provided for the overvoltage protection, can be designed to be considerably lower than normal.

The features are discussed in great detail in the text below insofar as they are essential for the invention, and they are described in greater detail by way of figures.

DETAILED DESCRIPTION OF THE PREFERRED EMBODIMENTS

The figures relate to an arrangement for an onboard motor vehicle power supply system, in particular, for an internal combustion engine, having a dynamo as a generator as well as having an energy store, in particular, a battery. However, the invention can be used advantageously for all onboard power supply systems wherein a generator powers an onboard power supply system, and it is not limited to vehicle onboard power supply systems. The invention is suitable, in particular, for the overvoltage protection of DC voltage systems powered by generators such as those used in mobile and/or in stationary installations.

Figure 2:
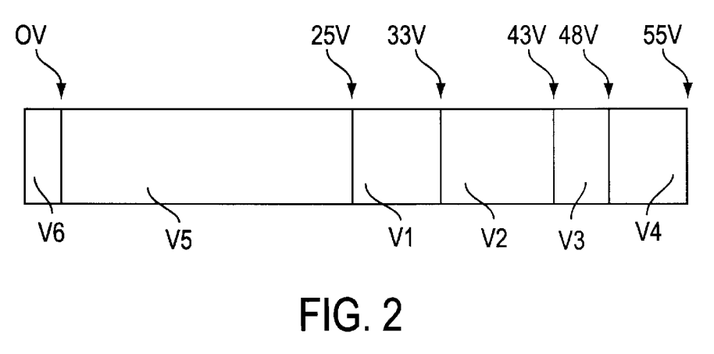
FIG. 2 graphically illustrates the various defined voltage ranges in a 42 V onboard power supply system.

FIG. 2 provides a graphic representation of the voltages in an onboard power supply system with a rated voltage of 42 V. For various operating conditions, permissible voltage ranges V1 to V6 are defined. Range V1, which extends from 25 V to 33 V, is the voltage to which the onboard power supply system is allowed to break down during the starting process of the internal combustion engine. When the generator is running, the battery voltage is in an admissible voltage range $V_2$ between 33 V and 43 V. Permanent overvoltages in the onboard power supply system are permitted in the range $V_3$ between 43 V and 48 V at maximum. Transient overvoltages are not permitted to exceed the range V4 between 48 V and 55 V. At voltages in the range V5 between 0 V and 25 V, the onboard power supply system is considered defective. A pole confusion (V6) with negative voltage values is not admissible.

It is advantageous if the threshold value for the response of the overvoltage protective device is not applied to the lower limit value of the interval 48 V–55 V (range V4). A limiting value approximately in the middle of the interval, preferably approx. 52 V, is useful. However, since permanent overvoltages up to 48 V are admissible, this means that a high precision of the protective circuit or arrangement is required because of the small range V4 within which the overvoltage protection of the invention must respond. This means, in particular, that the feedback threshold of the protective device must be independent of the temperature, if possible. In order to control a voltage in the onboard power supply system by around +/−3 V, a reference voltage, which is to be supplied by a reference unit of the overvoltage protective circuit, must be complied with by at least 1% or better. At the same time, an excess energy appearing if an overvoltage occurs must be eliminated from the onboard power supply system in an economically reasonable manner. This can be accomplished with the arrangement according to the invention within a wide temperature range, especially preferred between 40° C. and 125° C.

Figure 1:
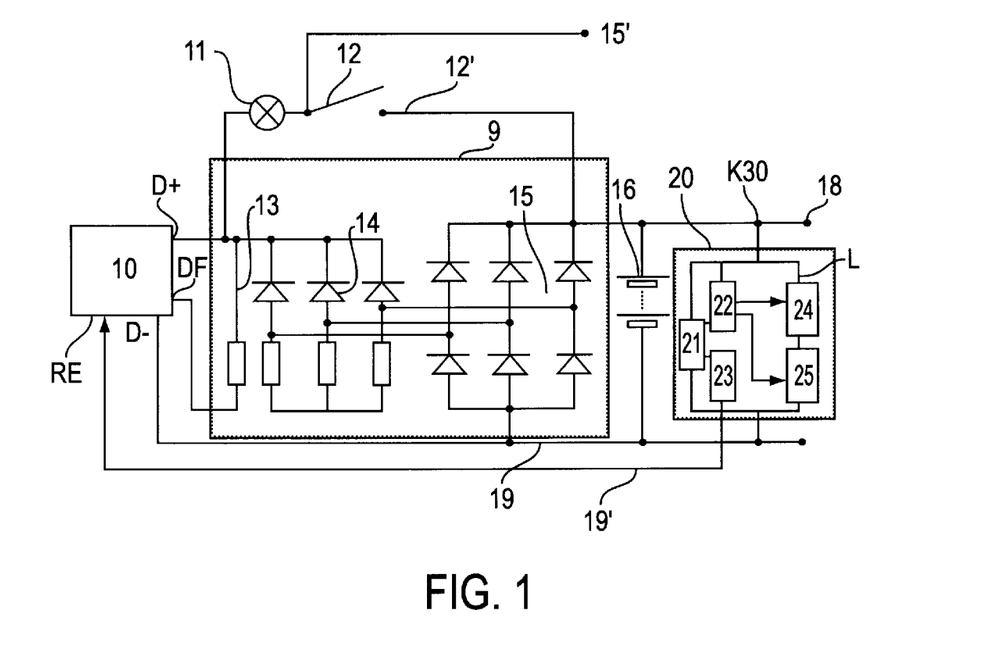
FIG. 1 is a schematic circuit diagram of a basic circuit arrangement according to the invention with a power branch, a voltage detecting unit, an actuating unit and a feedback unit.

A basic circuit arrangement according to the invention is shown in FIG. 1, in particular, by way of an onboard motor vehicle power supply system. As shown, the circuit arrangement or unit 20 is comprised of several subunits, and in particular a voltage detecting unit 21, an actuating or control unit 22, a voltage feedback unit 23, and a power branch L having the series connected resistance components 24, 25, and is connected in parallel with an onboard power supply system. The onboard power supply system voltage $V_B$ is present between a pair of power feed lines 18 and 19, with line 19 being a reference feed line. Feed line 19 serves as a joint reference potential for the overvoltage protective device or circuit 20. The onboard power supply system itself comprises various conventional circuit component elements, some of which are illustrated in FIG. 1, such as dynamo or D.C. generator 9 with various components 13, 14, 15, a dynamo or generator controller or regulator 10, an ignition lock 12, a charge control lamp 11 and the like. A preferred energy store 16 is connected between the lines 18 and 19 and is a battery. During normal operation, a conventional voltage control of the onboard power supply system voltage $V_B$ takes place via the line 12' which connects connection K30 with the terminal D+ via the ignition lock 12 and the charge control lamp 11. During the normal operation, the voltage detecting unit 21 only checks whether a predetermined voltage threshold $V_{Bmax}$ is reached or exceeded. Thus during normal operation, power branch L and feedback unit 23 no longer actively participate in a control of the onboard power supply system voltage.

In the power branch L of unit 20, which branch L is connected in parallel with the onboard power supply system, there are at lest two series connected resistance components or resistors 24 and 25, with at least one of these resistors component elements 24 and 25 preferably having a nonlinear current-voltage characteristic. The power branch L is intended for converting excess electrical energy occurring in the event of an overvoltage into heat in a manner which is harmless for the vehicle onboard power supply system. The resistance component elements 24, 25 in the power branch L may be simple resistors or may be formed by other components having an electrical resistance. Such an individual resistance component 24 or 25 can also be formed by several component elements, particularly integrated components which, as a whole, act like a resistor. In a linear or nonlinear manner, the electrical voltage can be a function of the current flowing through the component. A component in which the electrical voltage is a function of the current in a nonlinear manner, is identified as a nonlinear resistor. It is preferred that at least one of the resistors 24 and/or 25 has such a nonlinear current-voltage characteristic. The resistors 24 and 25 are preferably connected in series with respect to one another and from the power circuit branch L of Unit 20.

The voltage detecting unit 21 is charged with the onboard power supply system voltage $V_B$. The voltage detection unit 21 includes a reference unit 35, particularly a precision voltage source, as shown, for example, in FIGS. 3–6. The precision voltage or reference source 35 makes available a voltage reference for the control in the event of an overvoltage, also across a wide temperature range, in particular, from −40° C. to 125° C., with a precision of 1% or better. The reference unit 35 can be designed to be complex. A signal is triggered by the reference voltage source 35 if the onboard power supply system voltage $V_B$ exceeds a threshold $V_{Bmax}$ set by the precision voltage source 35, e. g., by means of a voltage pulse. This signal by source 35 is taken over by both the actuating unit 22 as well as the voltage feedback unit 23. In response to the signal from source 35, the actuating unit 22 controls one of the two resistors 24 and/or 25 so that current can flow through the same. Preferably, the actuated resistor is formed by a controllable semiconductor component with a linear or nonlinear current-voltage characteristic.

This actuation of one of the resistors 24 or 25 results in a voltage drop at the second or other resistor, which can be linear or nonlinear, according to the resistor's characteristic. The actuating unit 22 controls the resistance value of the actuated nonlinear resistor 24 or 25 in such a manner that the voltage drop across both resistors corresponds precisely to the value for the maximum onboard power supply system voltage $V_{Bmax}$. A current flows through the two resistors 24 and 25 and the excess electrical energy of the voltage pulse is converted into heat in the power branch L in the two resistors 24 and 25.

Advantageously, these measures compensate for possible tolerances of the component parameters of the resistors 24 and/or 25 as well as for their temperature dependence, and these tolerances must no longer be considered in the circuit design. The occurrence of voltage peaks in the onboard power supply system voltage is reliably prevented. Advantageously, this renders unnecessary the use of semiconductor switches with high breakdown voltages which are normally provided either at the output of the generator 9 and/or as protection for the individual electrical units provided in the onboard power supply system.

It is a further advantage that semiconductor switches with low breakdown voltage have a considerably smaller chip surface than those with a high breakdown voltage. With the arrangement according to the invention, the chip surface of components, particularly of the power switches, can be made smaller, which saves considerable costs. This aspect of the invention proves to be particularly advantageous for the use of onboard power supply systems with a relatively high power supply system voltage, e.g., of more than 40 V, because in this case the known overvoltage protective devices require semiconductor switches with a breakdown voltage that is considerably higher than 40 V. If a classic limitation with suppressor diodes would be carried out according to the state of the technology, overvoltages with 120 V −200 V would have to be permitted in the onboard power supply system. This cannot be applied to onboard power supply systems of motor vehicles.

In order to keep the energy of the voltage pulse as small as possible, the feedback unit 23 sends a signal to the generator controller or regulator 10 in the event of an overvoltage in order to adjust the output voltage in the generator 9 downward for a time duration $t_{LD}$ during which the overvoltage case is present. Therefore, the load on the resistors 24 and 25 remains tolerably small. If the voltage in the onboard power supply system drops again below the value of the maximum admissible onboard power supply system voltage $V_{Bmax}$, the actuated nonlinear resistor 24 or 25 again transitions into a high-impedance state and the feedback unit 23 emits a signal to the generator controller 10 that an overvoltage no longer exists. The generator 9 again adjusts to its desired value $V_B$ with a control for the normal operation.

Useful and advantageous embodiments of the invention differ, inter alia, in the power section of unit 20, which section is formed, in particular, by the resistors 24 and 25.

Figure 3:
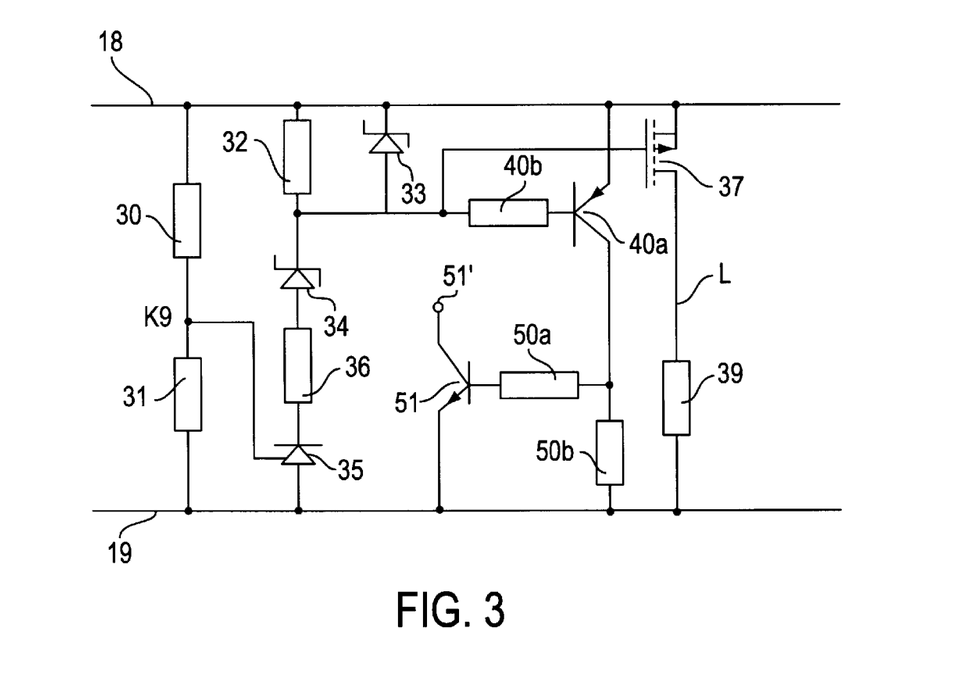
FIG. 3 is a schematic circuit diagram of the circuit 20 of FIG. 1 according to an embodiment of the invention with a power branch, a voltage detecting unit and actuating unit.

An advantageous embodiment of unit 20 is illustrated in FIG. 3. Unit 20 has a power branch L, a voltage detecting or circuit unit 21, an actuating unit or circuit 22, and a feedback unit or circuit 23. The onboard power supply system voltage $V_B$ is present between the feed lines 18 and 19.

In FIG. 3, the power branch L is formed by the resistors 37 and 39 which replace resistors 24 and 25. Resistor 37, in the form of an MOS transistor as shown, is connected in series with the linear resistor 39, with resistor (transistor) 37 being actuated by the actuating unit 22 and connected with feed line 18.

The voltage detecting unit 21 of FIG. 3 is comprised of a voltage divider which is formed of the series connected ohmic resistors 30 and 31 and which has a voltage divider tap K9 between the two resistors and the reference voltage source 35.

The actuating unit 22 of FIG. 3 is comprised of a series connection of an ohmic resistor 32, Zener diode 34 and an ohmic resistor 36 which series connection, in turn, is connected in series with the reference unit 35. The actuating unit 22 additionally includes a Zener diode 33 connected in parallel with the ohmic resistor 33.

A preferred wiring of the feedback unit 23 is, as shown in FIG. 3, comprised of a pnp transistor 40a whose emitter is connected to line 18 and whose base is connected via a resistor 40b to the connecting line between the actuating unit 22 and the resistor (transistor) 37 of the power branch L to be actuated i.e., the gate of MOS transistor 37. The collector of transistor 40a is connected via a resistor 50b with the reference potential line 19, and via a resistor 50a with the base of an npn transistor 51, whose emitter is connected to the line 19. Resistor 50a protects transistor 51 against currents that are too high. Preferably, transistor 51 is selected, as shown, to have a so-called "open collector" output selected. Connection 51' by the collector of transistor 51, is the connection to the generator controller 10, which is not illustrated separately in this figure, and which is modified such that it can pick up a signal of the feedback unit 23 so as to reduce the generator excitation if an overvoltage occurs. Preferably, the reference unit 35 is formed, as shown, by a precision voltage source which preferably operates according to the bandgap method, e.g., a thyristor as shown. It has a load terminal, a control terminal and a reference terminal. The control terminal is connected with the voltage divider tap K9 of the voltage detecting unit 21, the reference terminal is connected with the reference potential line 19, and the load terminal is preferably connected with the gate of MOSFET 37 via the resistor 36 and the Zener diode 34 or, in a different preferred embodiment according to FIG. 5, with the base of a transistor in an inverting unit. The refiner voltage source 35 supplies the threshold value of the maximum permissible onboard voltage $V_{Bmax}$ with a high precision.

Resistor 31 of the voltage detecting unit 21, the reference terminal of the reference unit 35 of the actuating unit 22 and the nonactuated resistor 39 in the power branch are all directly applied to the common reference potential line 19. The resistor 32, with the Zener diode 33 connected in parallel therewith, is connected between the gate connection and the source connection of the actuated MOS transistor (resistor) 37. The Zener diode 33 serves to protect the gate of transistor 37 against overvoltages.

If the onboard power supply system voltage at the voltage divider tap K9 exceeds the reference value $V_{Bmax}$, the reference unit 35 transitions from a high-impedance into a low-impedance state, depending on the level of the overvoltage. This permits a current flow through the ohmic resistors 32 and 36 as well as through the Zener diode 34.

The current flow through the resistor 32 generates a voltage drop across the resistor 32 which is used to actuate the gate of transistor 37, particularly of a p-channel MOS transistor as shown. This, in turn, permits a current flow through the power branch L which generates a voltage drop at the nonactuated resistor 39.

According to the invention, the gate-source voltage of transistor 37 is controlled by means of the voltage detecting unit 21 and the actuating unit 22 such that the voltage drop across the actuated transistor 37 corresponds exactly to the difference between the maximum permissible onboard power supply system voltage $V_{Bmax}$ and the voltage drop across the nonactuated resistor 39.

The upper limit of the onboard power supply system voltage $V_{Bmax}$ can be set via the division ratio of resistors 30 and 31 which form a voltage divider.

It is advisable that the precision voltage source 35 be protected against overcurrent and overvoltage by the resistor 36 and the Zener diode 34. Since the precision voltage source 35 is usually not designed for higher operating voltages, it must be ensured that the voltage which drops at the precision voltage source 35, cannot become greater than its maximum operating voltage. The resistor 36 limits the current which can flow through the precision voltage source 35. A limitation of the current through the reference unit 35 is advantageous for all embodiments according to the invention which are provided with component elements as overvoltage protection in unit 20 outside of the power branch, which component elements reach the breakdown or the conductive state, and can thus result in a large electrical current through the reference unit, preferably the precision voltage source 35, such as, in particular, the Zener diodes 33 and 34 in FIGS. 3 and 5 and/or the base emitter diodes of a transistor which can reach the conductive state, as is provided in FIGS. 5 and 6.

Figure 4:
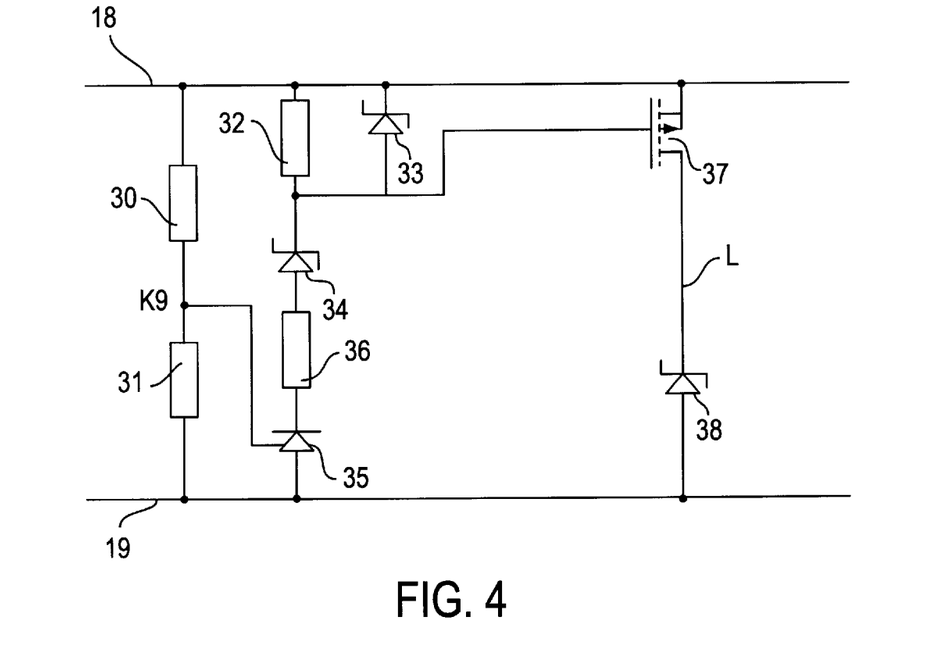
FIG. 4 is a schematic circuit diagram of a further embodiment according to the invention of the circuit 20 of FIG. 1, having a nonlinear resistor in the power branch.

A further advantageous embodiment of the invention is illustrated in FIG. 4. The arrangement is similar to that in FIG. 3, but here the nonactuated, linear resistor 39 in the power branch L of unit 20 is replaced by a nonlinear resistor 38, particularly a suppressor or limiter diode and/or a Zener diode as shown. It is advantageous in this arrangement that less power must be converted in the transistor 37 than in the embodiment according to FIG. 3. This implies the advantage that smaller and less expensive transistor components can be used. It is also useful to use a Zener diode 38 whose breakdown voltage is at least 5% greater than the onboard power supply system voltage.

Figure 5:
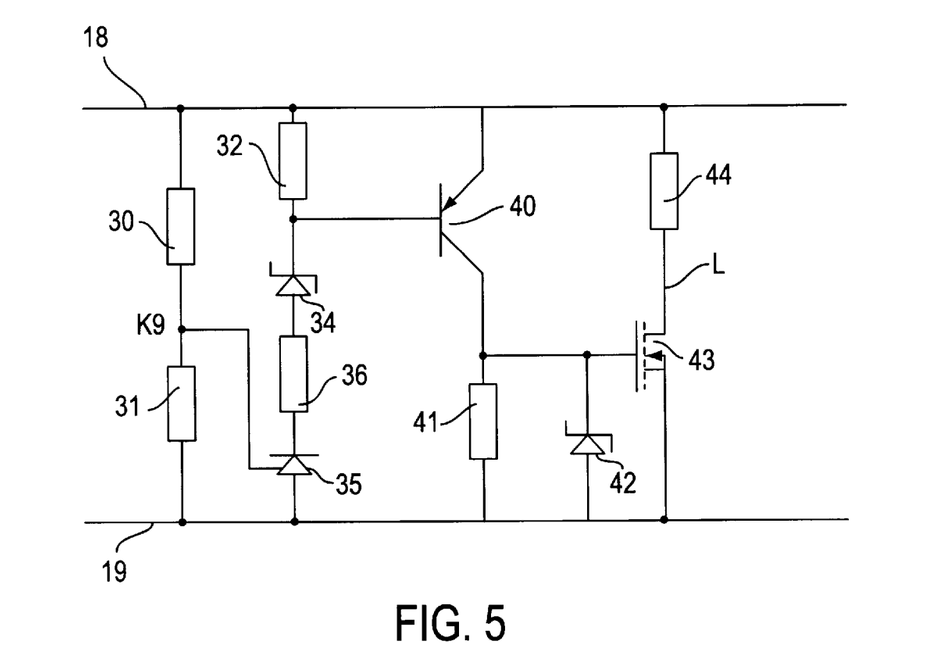
FIG. 5 is a schematic circuit diagram of a further embodiment according to the invention of the circuit 20 of FIG. 1 with an inverted actuating signal of the actuated resistor in the power branch.

FIG. 5 shows a further preferred arrangement. The design of the voltage detecting unit 21 and of the precision voltage source 35 corresponds to the design of these units in FIGS. 3 and 4. Unit 20 has a power branch L, a voltage detecting unit 21 and an actuating unit 22. The feedback unit 23 is not shown in this figure. The power branch L is formed by resistors 43 and 44. Resistor 43, which is formed by an MOS transistor as shown, is connected in series with the linear resistor 44, with resistor 43 being actuated by the actuating unit 22. The difference with respect to the above-described arrangements is that here the actuated resistor 43 is connected to feed line 19, i.e., the common reference potential of unit 20.

This requires a potential shift or displacement and an inversion of the actuating signal for the MOS transistor 43. The nonactuated resistor 44 has a linear current-voltage characteristic, in particular, resistor 44 is an ohmic resistor. The potential shift and inversion of the actuating signal take place via an inverting unit which is formed, in particular, by a series connection of a p-n-p transistor 40 and a resistor 41, which is arranged between the feed lines 18 and 19.

The actuating unit 22 is slightly modified and is comprised of a series connection of the ohmic resistor 32, the Zener diode 34, the ohmic resistor 36 and the reference unit 35 having a reference terminal at the reference potential line 19, a control terminal connected to a K9 of the voltage detecting unit, and a load terminal connected via protective resistor 36 and protective Zener diode 34 to the base of transistor 40. The base of the transistor 40 is connected with the actuating unit 22 at the common connection between the Zener diode 34 and the resistor 32. The Zener diode 33 of the previous embodiments is not present.

The gate of the actuated resistor or transistor 43 is protected by a Zener diode 42 which is connected between the gate connection and the source connection of transistor (resistor) 43, particularly of an n-channel MOS transistor, and in parallel with the resistor 41. The source connection of the actuated MOS transistor, resistor 41, the reference terminal of reference unit 35 and the end of resistor 31 all are connected to the common reference potential line 19.

The special advantage of the solution is that with the selected arrangement for the actuated resistor 43, particularly an n-channel MOS transistor can be used. These components are usually considerably less expensive than their complementary p-channel MOS transistor types used in the circuits of FIGS. 3 and 4.

Figure 6:
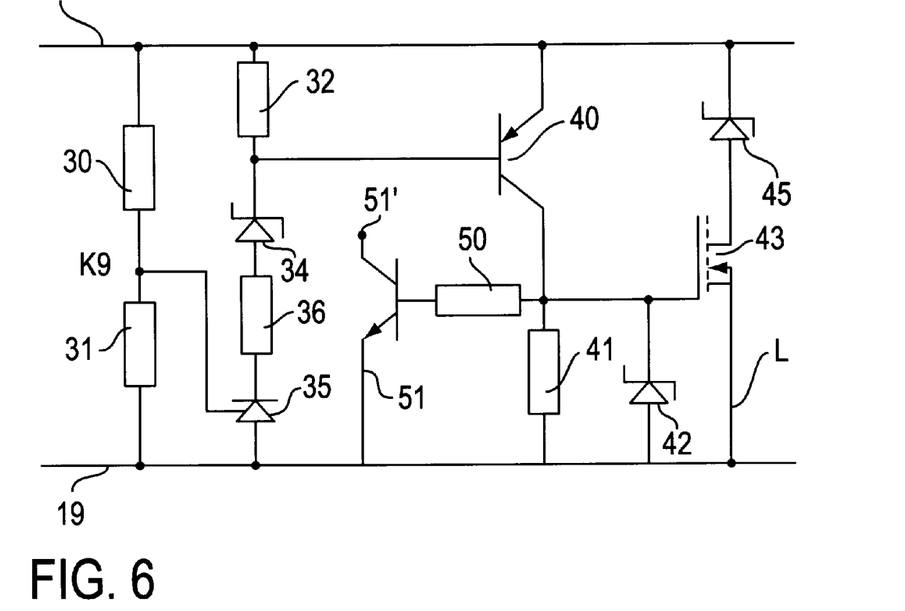
FIG. 6 is a schematic circuit diagram of another embodiment according to the invention of the circuit 20 of FIG. 1 with a feedback unit according to the invention.

FIG. 6 illustrates a preferred alternative arrangement which has advantages that are similar to the arrangement in FIG. 5. The components are arranged essentially in the same manner as in FIG. 5 The power branch L is provided with the resistors 43 and 45. Here, just like the actuated resistor 43, the nonactuated resistor 45, however, has a nonlinear current-voltage characteristic and preferably is a Zener diode.

In addition, FIG. 6 shows the voltage feedback unit 23 which is preferably comprised of an ohmic resistor 50 having one end connected to the base and an n-p-n transistor 51. The resistor 50 protects the transistor 51 from currents that are too high. Preferably, a transistor 51 having a so-called "open collector" output is selected here. Terminal 51', i.e., the collector terminal of the transistor 51, is connected to the input RE of generator controller or regulator 10, not shown separately in this figure, and which is modified such that it can pick up a signal of the feedback unit 23 so as to reduce the generator excitation if an overvoltage occurs. The emitter of transistor 51 is connected to the reference potential line 19, where the free end of resistor 50, i.e., the end not connected to the base of transistor 41, is connected to the common connection of the transistor 40 and resistor 41 of the inverting unit.

Figure 7:
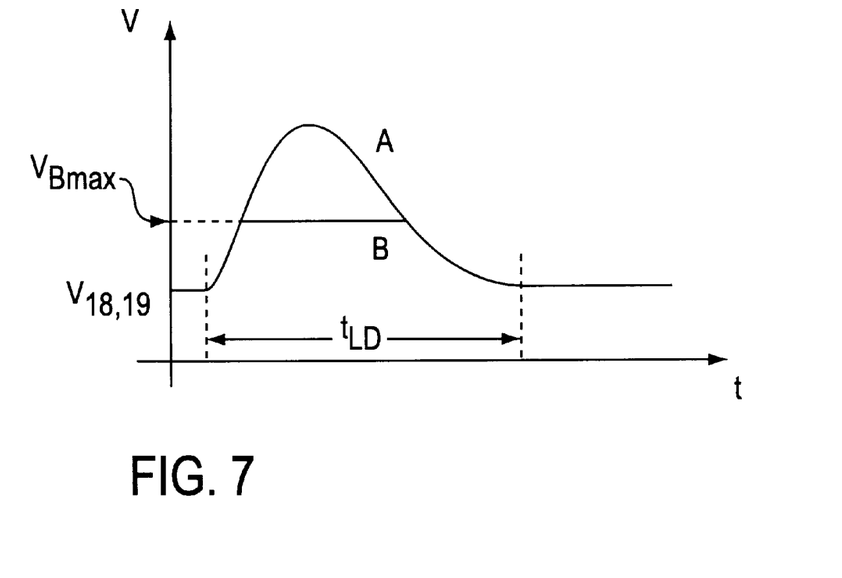
FIG. 7 is a voltage-time curve of the onboard power supply system voltage of an arrangement according to the invention.

FIG. 7 illustrates a course of the measured onboard power supply system voltage $V_B=V_{18,19}$ over time between the feed lines 18 and 19 in two states. Curve A shows the course of the onboard power supply system voltage during load shedding without overvoltage protection. The shape of the curve shows that the, maximum admissible onboard power supply system voltage $V_{Bmax}$ is clearly exceeded.

Curve B illustrates the course of the onboard power supply system voltage over time with one of the circuit arrangements according to the invention. The maximum permissible value of the onboard power supply system voltage $V_{Bmax}$ is not exceeded, but rather the supply voltage is kept constant precisely and without having even briefly occurring voltage peaks. Once the overvoltage case has decayed, the value of the onboard power supply system voltage $V_B$ drops back to the normal operating value. The illustrated behavior is accomplished with all of the arrangements according to the invention that were described, particularly across a wide temperature range.

As indicated above, the conventional generator controller or regulator 10 must be modified in order to reduce the generator excitation according to the invention. In a classic generator controller in a conventional 12 V onboard power supply system according to the state of the technology, the rise and reduction of the excitation current in the excitation winding 13 of the generator is controlled via a single switch.

Figure 8A:
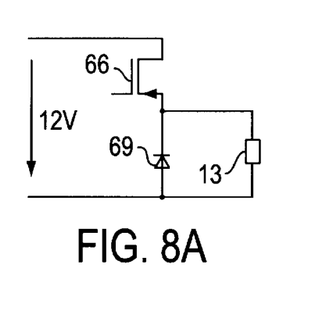
FIGS. 8a and 8b respectively show a circuit and the corresponding current path of the generator excitation according to the state of the art.
Figure 8B:
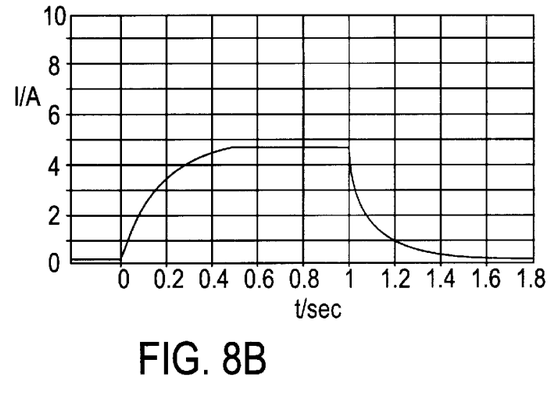

FIG. 8a schematically shows such a circuit arrangement with a switch 66 which relates to the onboard power supply system voltage for which switch 66 a MOSFET is selected here by way of example. At the same time, the current course of the generator excitation voltage is shown in FIG. 8b. For the buildup of the excitation current, switch 66 is conductive. The speed of the current rise follows from the onboard power supply system voltage (12 V), and the resistance and the inductance of the excitation winding 13. When the rated voltage of the onboard power supply system is reached, but also in the event of an overvoltage, switch 66 is switched off or rendered non-conductive so that the current of the exciter winding 13 continues to flow via the diode 69 which is connected in series with the switch 66 and in parallel with the excitation winding 13. The time constant for the reduction of the current is determined by the series resistance of the excitation winding or coil 13. For the current supply and for the excitation of the generator, the time constant usually is at approx. 500–600 ms. If an overvoltage occurs, the generator resupplies further supplies power during this time. There is no terminal or connection on the generator controller 10 for an overvoltage signal from a possible voltage feedback unit 23.

Figure 9A:
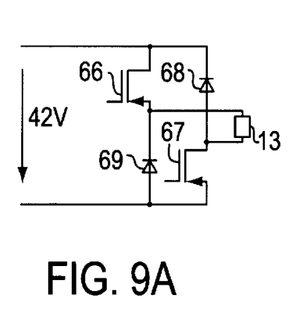
FIGS. 9a and 9b respectively show a circuit and the corresponding current path of the generator excitation with rapid de-energizing according to the invention.

FIG. 9a schematically shows a preferred switch arrangement in a modified generator controller or regulator 10 according to the invention with which the excitation current can be reduced rapidly if an overvoltage occurs. The voltage of the onboard power supply system amounts to preferably nominally 42 V. The series connection and switch 66 and diode 69 are disposed in parallel to a series connection of an additional switch 67 and an additional diode 68. The exciter winding 13 is connected between the two branches in that one end of winding 13 is connected between switch 66 and diode 69 and the other end of winding 13 is connected between switch 67 and diode 68. The excitation winding 13 is connected to the onboard power supply system voltage by the additional switch 67. Switch 67 remains closed or conductive for the control to the rated voltage, so that during normal operation, this results in the same time constant for the current reduction as in FIG. 8b. This is advantageous for a smaller current ripple. The current rise is accelerated by more than a factor of 10 because of the increased onboard power supply system voltage.

Figure 9B:
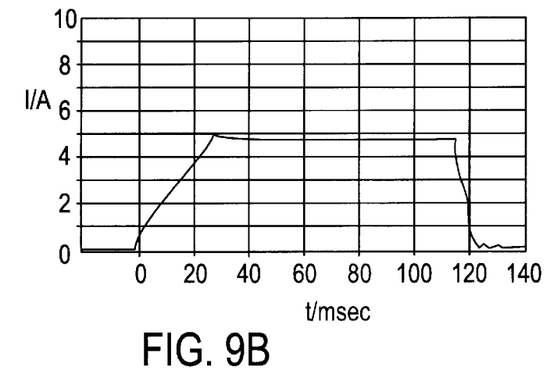

If an overvoltage occurs, both switches 66 and 67 are switched off or rendered non-conductive, so that the current of the excitation winding 13 is reduced via the diodes 68 and 69 vis-a-vis the onboard power supply system voltage of 42 V. The current course of the generator excitation is illustrated in FIG. 9b. The time for the current reduction resulting therefrom amounts to approx. 10 ms. This is faster by approx. a factor of 50 than in the example according to the state of the technology for a 12 V onboard power supply system. If the generator excitation would not be reduced rapidly in the event of an overvoltage, this would imply a high power output of the generator during a time of a few hundred milliseconds. This is a great hazard and leads to the destruction of the protective device in extreme cases. This malfunction must be reliably eliminated. The invention provides that, in the event of an overvoltage, the modified voltage controller or regulator 10 permits the voltage to be commutated downward out of the excitation winding 13 considerably faster than normal by means of an additional path via the switch 67. For this purpose, the controller 10 can also be modified in a different manner, which preferably should take place in that the rapid de-energizing of the generator 9 gets a higher priority if an overvoltage occurs than under the normal onboard power supply system control.

Figure 10:
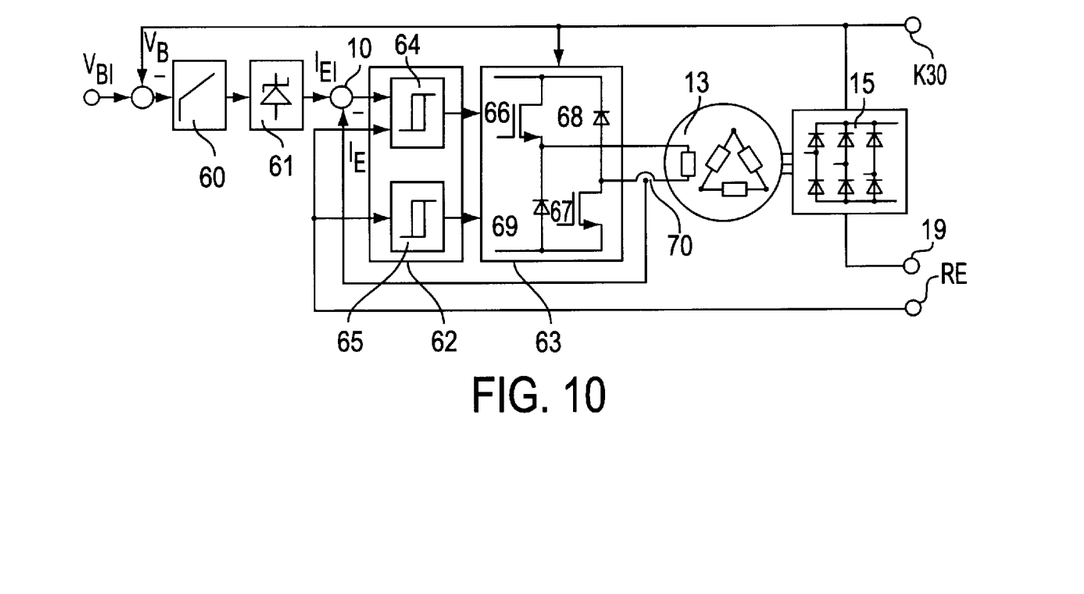
FIG. 10 is a schematic block diagram of a generator with rapid de-energizing according to the invention.

FIG. 10 shows the schematic direct design of a preferred embodies of the generator voltage regulator which is provided with an additional input RE for a rapid de-energizing. The output of the feedback unit 23 is connected with this input RE and triggers the rapid de-energizing if an overvoltage occurs. The actuation or control circuit 63 for the exciter winding 13 comprises the switch 66, 67 for the excitation current and the free-wheeling diodes 68, 69. They are actuated by a control unit 62 preferably with pulse-shaped signals. The preferred embodiment permits a limitation of the excitation current in addition to the rapid de-energizing.

By means of the measured current signal of a current sensor or detector 70, a current control is implemented via an actuating circuit 64 for switch 66; the current control 70 receives its desired current value $I_{EI}$ from an advantageous voltage control including units 60 and 61. Preferably, unit 60 is a controller with proportional-integral characteristic controlled by the difference of the desired value $V_{BI}$ and the onboard power supply system voltage $V_B$ measured at terminal K30. $V_{BI}$ represents the input voltage value for the PI controller 60 and is equivalent to the onboard power supply system voltage $V_B$. The unit 61 is a limiter which limits the desired value for the excitation current. By way of these superposed control circuits, the current in the exciter winding 13 is also reliably limited in onboard power supply systems having a relatively high voltage.

Figure 11:
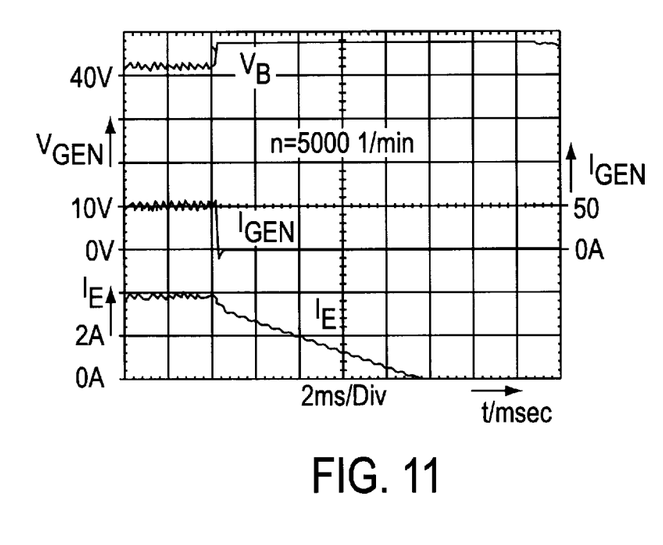
FIG. 11 shows a measuring curve with load shedding in a 42 V onboard power supply system with overvoltage protection according to the invention.

If the signal for the occurrence of an overvoltage is present at RE, switches 66 and 67 are switched off via the actuation circuits 64 and 65. FIG. 11 shows the measured current and voltage courses in such a generator which is wired with an overvoltage protective device according to the invention. The current in the generator $I_{GEN}$ is forced to instantaneously become zero because of the power shedding. The overvoltage in the onboard power control system reaches a maximum of 49 V. The excitation current can be reduced by the rapid de-energizing triggered by the feedback unit 23 within approx. 10 ms.

The invention now being fully described, it will be apparent to one of the ordinary skill in the art that many changes and modifications can be made thereto without departing from the spirit or scope of the invention as set forth herein.

In the claims:

1. An overvoltage protective device, to protect an electrical installation from overvoltage, which installation has an onboard power supply system including an electrical generator and a generator voltage regulator for controlling the output voltage of the generator and having power and reference leads fed by the electrical generator and electrical devices connected thereto, said device comprising:

a basic unit connected in parallel with the onboard power supply system at the output side of the generator, with said unit having at least one power circuit branch connected in parallel with the onboard power supply system across the power and reference leads, a voltage detecting unit and an actuating unit, said power circuit branch including at least two resistance components, with at least one of the resistance components being controllable to reduce its resistance and said voltage detecting unit and said actuating unit including circuit means for monitoring the voltage of the power supply and for controlling the at least one controllable resistance component to reduce its resistance and fixedly set the power supply voltage to a limiting threshold value $V_{BMAX}$ when the power supply voltage exceeds the limiting threshold value ($V_{Bmax}$), which value is above the rated voltage of the system generator; and wherein said basic unit further includes a voltage feedback unit, which is connected to said circuit means, for emitting a control signal to the generator voltage regulator to cause a reduction of the generator excitation voltage if an overvoltage is detected; and wherein the voltage system is a vehicle onboard power supply system having said generator and an energy store connected in parallel.

2. An overvoltage protective device to protect an electrical installation from overvoltage, which installation has an onboard power supply system including an electrical generator and a generator voltage regulator for controlling the output voltage of the generator and having power and reference leads fed by the electrical generator and electrical devices connected thereto, said device comprising:

a basic unit connected in parallel with the onboard power supply system at the output side of the generator, with said unit having at least one power circuit branch connected in parallel with the onboard power supply system across the power and reference leads, a voltage detecting unit and an actuating unit, said power circuit branch including at least two resistance components, with at least one of the resistance components being controllable to reduce its resistance and said voltage detecting unit and said actuating unit including circuit means for monitoring the voltage of the power supply and for controlling the at least one controllable resistance component to reduce its resistance and fixedly set the power supply voltage to a limiting threshold value $V_{BMAX}$ when the power supply voltage exceeds the limiting threshold value ($V_{Bmax}$), which value is above the rated voltage of the system generator; and wherein said basic unit further includes a voltage feedback unit, which is connected to said circuit means, for emitting a control signal to the generator voltage regulator to cause a reduction of the generator excitation voltage if an overvoltage is detected; and wherein the generator voltage regulator includes circuit means for at least functionally separating control interventions during normal operation and control interventions in the event of an overvoltage from one another.

3. An overvoltage protective device according to claim 2 wherein the generator voltage regulator has a separate input which is connected with the voltage feedback unit to receive its feedback voltage and which is provided for the purpose of forwarding the signals of the voltage feedback unit if an overvoltage occurs so as to influence the excitation of the generator at least indirectly.

4. An overvoltage protective device to protect an electrical installation from overvoltage, which installation has an onboard power supply system including an electrical generator and a generator voltage regulator for controlling the output voltage of the generator and having power and reference leads fed by the electrical generator and electrical devices connected thereto, said device comprising:

a basic unit connected in parallel with the onboard power supply system at the output side of the generator, with said unit having at least one power circuit branch connected in parallel with the onboard power supply system across the power and reference leads, a voltage detecting unit and an actuating unit, said power circuit branch including at least two resistance components, with at least one of the resistance components being controllable to reduce its resistance and said voltage detecting unit and said actuating unit including circuit means for monitoring the voltage of the power supply and for controlling the at least one controllable resistance component to reduce its resistance and fixedly set the power supply voltage to a limiting threshold value $V_{BMAX}$ when the power supply voltage exceeds the limiting threshold value ($V_{Bmax}$), which value is above the rated voltage of the system generator; and wherein said basic unit further includes a voltage feedback unit, which is connected to said circuit means, for emitting a control signal to the generator voltage regulator to cause a reduction of the generator excitation voltage if an overvoltage is detected; and wherein said circuit means of said generator voltage regulator includes means for rapidly reducing a voltage from an exciter winding of the generator in less than 500 ms.

5. An overvoltage protective device according to claim 4, wherein the means for rapidly reducing a voltage includes at least one switch connected in series with a free-wheeling diode in addition to a further switch for controlling overloads during normal operation.

6. An overvoltage protective device according to claim 4, wherein the circuit means for the rapidly de-reducing are structurally and electrically integrated into the generator voltage regulator (10).

7. An overvoltage protective device to protect an electrical installation from overvoltage, which installation has an onboard power supply system including an electrical generator and a generator voltage regulator for controlling the output voltage of the generator and having power and reference leads fed by the electrical generator and electrical devices connected thereto, said device comprising:

a basic unit connected in parallel with the onboard power supply system at the output side of the generator, with said unit having at least one power circuit branch connected in parallel with the onboard power supply system across the power and reference leads, a voltage detecting unit and an actuating unit, said power circuit branch including at least two resistance components, with at least one of the resistance components being controllable to reduce its resistance and said voltage detecting unit and said actuating unit including circuit means for monitoring the voltage of the power supply and for controlling the at least one controllable resistance component to reduce its resistance and fixedly set the power supply voltage to a limiting threshold value $V_{BMAX}$ when the power supply voltage exceeds the limiting threshold value ($V_{Bmax}$), which value is above the rated voltage of the system generator; and wherein said basic unit further includes a voltage feedback unit, which is connected to said circuit means, for emitting a control signal to the generator voltage regulator to cause a reduction of the generator excitation voltage if an overvoltage is detected; and wherein the generator voltage regulator includes further circuit means for limiting the exciter current of the exciter winding of the generator.

8. An overvoltage protective device according to claim 7, wherein said further circuit means for limiting the exciter current includes at least one voltage control circuit having a desired input voltage ($V_{BI}$) and an actuating circuit (64) responsive to the feedback voltage for controlling the regulator circuit.

9. An overvoltage protective device according to claim 8 wherein the same reference voltage unit is provided for making available the input voltage ($V_{BI}$) of the control for the rated onboard power supply system voltage, and for making available the threshold value ($V_{Bmax}$) of the overvoltage protective device.

10. An overvoltage protective device to protect an electrical installation from overvoltage, which installation has an onboard power supply system including an electrical generator and a generator voltage regulator for controlling the output voltage of the generator and having power and reference leads fed by the electrical generator and electrical devices connected thereto, said device comprising:

a basic unit connected in parallel with the onboard power supply system at the output side of the generator, with said unit having at least one power circuit branch connected in parallel with the onboard power supply system across the power and reference leads, a voltage detecting unit and an actuating unit, said power circuit branch including at least two resistance components, with at least one of the resistance components being controllable to reduce its resistance and said voltage detecting unit and said actuating unit including circuit means for monitoring the voltage of the power supply and for controlling the at least one controllable resistance component to reduce its resistance and fixedly set the power supply voltage to a limiting threshold value $V_{BMAX}$ when the power supply voltage exceeds the limiting threshold value ($V_{Bmax}$), which value is above the rated voltage of the system generator; and wherein said basic unit further includes a voltage feedback unit, which is connected to said circuit means, for emitting a control signal to the generator voltage regulator to cause a reduction of the generator excitation voltage if an overvoltage is detected; and wherein the generator voltage regulator and the unit for the overvoltage protection are combined in a single control device.

11. An overvoltage protective device to protect an electrical installation from overvoltage, which installation has an onboard power supply system including an electrical generator and a generator voltage regulator for controlling the output voltage of the generator and having power and reference leads fed by the electrical generator and electrical devices connected thereto, said device comprising:

a basic unit connected in parallel with the onboard power supply system at the output side of the generator, with said unit having at least one power circuit branch connected in parallel with the onboard power supply system across the power and reference leads, a voltage detecting unit and an actuating unit, said power circuit branch including at least two resistance components, with at least one of the resistance components being controllable to reduce its resistance and said voltage detecting unit and said actuating unit including circuit means for monitoring the voltage of the power supply and for controlling the at least one controllable resistance component to reduce its resistance and fixedly set the power supply voltage to a limiting threshold value $V_{BMAX}$ when the power supply voltage exceeds the limiting threshold value ($V_{Bmax}$), which value is above the rated voltage of the system generator; and wherein said basic unit further includes a voltage feedback unit, which is connected to said circuit means, for emitting a control signal to the generator voltage regulator to cause a reduction of the generator excitation voltage if an overvoltage is detected; and wherein the voltage feedback unit includes an npn transistor whose emitter is connected with the reference potential line (19) of the voltage system and whose collector is connected to the additional input of the generator voltage regulator.

12. An overvoltage protective device to protect an electrical installation from overvoltage, which installation has an onboard power supply system including an electrical generator and a generator voltage regulator for controlling the output voltage of the generator and having power and reference leads fed by the electrical generator and electrical devices connected thereto, said device comprising:

a basic unit connected in parallel with the onboard power supply system at the output side of the generator, with said unit having at least one power circuit branch connected in parallel with the onboard power supply system across the power and reference leads, a voltage detecting unit and an actuating unit, said power circuit branch including at least two resistance components, with at least one of the resistance components being controllable to reduce its resistance and said voltage detecting unit and said actuating unit including circuit means for monitoring the voltage of the power supply and for controlling the at least one controllable resistance component to reduce its resistance and fixedly set the power supply voltage to a limiting threshold value $V_{BMAX}$ when the power supply voltage exceeds the limiting threshold value ($V_{Bmax}$), which value is above the rated voltage of the system generator; and wherein said basic unit further includes a voltage feedback unit, which is connected to said circuit means, for emitting a control signal to the generator voltage regulator to cause a reduction of the generator excitation voltage if an overvoltage is detected; and wherein the voltage detecting unit comprises a voltage divider having at least two resistors with a voltage divider tap (K9) connected between the two resistors, and with the voltage divider being connected between the power and reference leads of the voltage supply system.

13. An overvoltage protective device to protect an electrical installation from overvoltage, which installation has an onboard power supply system including an electrical generator and a generator voltage regulator for controlling the output voltage of the generator and having power and reference leads fed by the electrical generator and electrical devices connected thereto, said device comprising:

a basic unit connected in parallel with the onboard power supply system at the output side of the generator, with said unit having at least one power circuit branch connected in parallel with the onboard power supply system across the power and reference leads, a voltage detecting unit and an actuating unit, said power circuit branch including at least two resistance components, with at least one of the resistance components being controllable to reduce its resistance and said voltage detecting unit and said actuating unit including circuit means for monitoring the voltage of the power supply and for controlling the at least one controllable resistance component to reduce its resistance and fixedly set the power supply voltage to a limiting threshold value $V_{BMAX}$ when the power supply voltage exceeds the limiting threshold value ($V_{Bmax}$), which value is above the rated voltage of the system generator; and wherein said basic unit further includes a voltage feedback unit, which is connected to said circuit means, for emitting a control signal to the generator voltage regulator to cause a reduction of the generator excitation voltage if an overvoltage is detected; and wherein the actuating unit includes a reference voltage unit for providing the threshold voltage value.

14. An overvoltage protective device according to claim 13, wherein the reference voltage unit is formed by a precision voltage source.

15. An overvoltage protective device to protect an electrical installation from overvoltage, which installation has an onboard power supply system including an electrical generator and a generator voltage regulator for controlling the output voltage of the generator and having power and reference leads fed by the electrical generator and electrical devices connected thereto, said device comprising:

a basic unit connected in parallel with the onboard power supply system at the output side of the generator, with said unit having at least one power circuit branch connected in parallel with the onboard power supply system across the power and reference leads, a voltage detecting unit and an actuating unit, said power circuit branch including at least two resistance components, with at least one of the resistance components being controllable to reduce its resistance and said voltage detecting unit and said actuating unit including circuit means for monitoring the voltage of the power supply and for controlling the at least one controllable resistance component to reduce its resistance and fixedly set the power supply voltage to a limiting threshold value $V_{BMAX}$ when the power supply voltage exceeds the limiting threshold value ($V_{Bmax}$), which value is above the rated voltage of the system generator; and wherein said basic unit further includes a voltage feedback unit, which is connected to said circuit means, for emitting a control signal to the generator voltage regulator to cause a reduction of the generator excitation voltage if an overvoltage is detected; and wherein the actuating unit is comprised of a first ohmic resistor having one end connected to the power lead and a first Zener diode connected in parallel with the first resistor, as well as of a series connection of a second Zener diode, a second ohmic resistor and a reference voltage unit connected between the other end of the first resistor and the reference voltage lead of the voltage supply system.

16. An overvoltage protective device to protect an electrical installation from overvoltage, which installation has an onboard power supply system including an electrical generator and a generator voltage regulator for controlling the output voltage of the generator and having power and reference leads fed by the electrical generator and electrical devices connected thereto, said device comprising:

a basic unit connected in parallel with the onboard power supply system at the output side of the generator, with said unit having at least one power circuit branch connected in parallel with the onboard power supply system across the power and reference leads, a voltage detecting unit and an actuating unit, said power circuit branch including at least two resistance components, with at least one of the resistance components being controllable to reduce its resistance and said voltage detecting unit and said actuating unit including circuit means for monitoring the voltage of the power supply and for controlling the at least one controllable resistance component to reduce its resistance and fixedly set the power supply voltage to a limiting threshold value $V_{BMAX}$ when the power supply voltage exceeds the limiting threshold value ($V_{Bmax}$), which value is above the rated voltage of the system generator; and wherein said basic unit further includes a voltage feedback unit, which is connected to said circuit means, for emitting a control signal to the generator voltage regulator to cause a reduction of the generator excitation voltage if an overvoltage is detected; and wherein at least one resistance component in the power branch (L) has a nonlinear current-voltage characteristic.

17. An overvoltage protective device according to claim 16, wherein the non-controlled resistance component in the power branch (L) is formed by one of a Zener diode and a limited diode.

18. An overvoltage protective device according to claim 16, wherein the power branch (L) comprises a series connection of a p-channel MOS transistor and one of an ohmic resistor, a limiter diode and a Zener diode (38).

19. An overvoltage protective device to protect an electrical installation from overvoltage, which installation has an onboard power supply system including an electrical generator and a generator voltage regulator for controlling the output voltage of the generator and having power and reference leads fed by the electrical generator and electrical devices connected thereto, said device comprising:

a basic unit connected in parallel with the onboard power supply system at the output side of the generator, with said unit having at least one power circuit branch connected in parallel with the onboard power supply system across the power and reference leads, a voltage detecting unit and an actuating unit, said power circuit branch including at least two resistance components, with at least one of the resistance components being controllable to reduce its resistance and said voltage detecting unit and said actuating unit including circuit means for monitoring the voltage of the power supply and for controlling the at least one controllable resistance component to reduce its resistance and fixedly set the power supply voltage to a limiting threshold value $V_{BMAX}$ when the power supply voltage exceeds the limiting threshold value ($V_{Bmax}$), which value is above the rated voltage of the system generator; and wherein said basic unit further includes a voltage feedback unit, which is connected to said circuit means, for emitting a control signal to the generator voltage regulator to cause a reduction of the generator excitation voltage if an overvoltage is detected; and wherein in the controlled resistance component in the power branch (L) is a actuated semiconductor component.

20. An overvoltage protective device according to claim 19, wherein the controlled resistance component is formed by one of a p-channel MOS transistor and an n-channel MOS transistor.

21. An overvoltage protective device to protect an electrical installation from overvoltage, which installation has an onboard power supply system including an electrical generator and a generator voltage regulator for controlling the output voltage of the generator and having power and reference leads fed by the electrical generator and electrical devices connected thereto, said device comprising:

a basic unit connected in parallel with the onboard power supply system at the output side of the generator, with said unit having at least one power circuit branch connected in parallel with the onboard power supply system across the power and reference leads, a voltage detecting unit and an actuating unit, said power circuit branch including at least two resistance components, with at least one of the resistance components being controllable to reduce its resistance and said voltage detecting unit and said actuating unit including circuit means for monitoring the voltage of the power supply and for controlling the at least one controllable resistance component to reduce its resistance and fixedly set the power supply voltage to a limiting threshold value $V_{BMAX}$ when the power supply voltage exceeds the limiting threshold value ($V_{Bmax}$), which value is above the rated voltage of the system generator; and wherein said basic unit further includes a voltage feedback unit, which is connected to said circuit means, for emitting a control signal to the generator voltage regulator to cause a reduction of the generator excitation voltage if an overvoltage is detected; and wherein the unit connected in parallel with the onboard power supply system at the generator output has at least one said power branch, said voltage detecting unit, said actuating unit, said voltage feedback unit, and an inverting unit for inverting the output signal of said actuating unit.

22. An overvoltage protective device according to claim 21, wherein the inverting unit includes the series connection of a p-n-p transistor and a resistor connected between the power and reference feed lines, with the base of the transistor being connected with an output of the actuating unit and with the resistor being connected with the reference potential feed line for the unit.

23. An overvoltage protective device according to claim 22, wherein the power circuit branch (L) includes the series connection of an n-channel MOSFET and one of an ohmic resistor, a limiter diode and a Zener diode, with a further Zener diode connected between the gate connection and the source connection of the MOSFET and, with the source connection of the MOSFET being connected with the reference potential lead.

24. An overvoltage protective device to protect an electrical installation from overvoltage, which installation has an onboard power supply system including an electrical generator and a generator voltage regulator for controlling the output voltage of the generator and having power and reference leads fed by the electrical generator and electrical devices connected thereto, said device comprising:

a basic unit connected in parallel with the onboard power supply system at the output side of the generator, with said unit having at least one power circuit branch connected in parallel with the onboard power supply system across the power and reference leads, a voltage detecting unit and an actuating unit, said power circuit branch including at least two resistance components, with at least one of the resistance components being controllable to reduce its resistance and said voltage detecting unit and said actuating unit including circuit means for monitoring the voltage of the power supply and for controlling the at least one controllable resistance component to reduce its resistance and fixedly set the power supply voltage to a limiting threshold value $V_{BMAX}$ when the power supply voltage exceeds the limiting threshold value ($V_{Bmax}$), which value is above the rated voltage of the system generator; and wherein said basic unit further includes a voltage feedback unit, which is connected to said circuit means, for emitting a control signal to the generator voltage regulator to cause a reduction of the generator excitation voltage if an overvoltage is detected; and wherein the actuating unit includes a series connection of a first resistor, a first Zener diode, a second resistor and a reference unit having a control terminal connected with a tap of a voltage divider forming said voltage detecting unit, a reference terminal connected to the reference potential lead, and a load terminal connected via the second resistor and the first Zener diode to the first resistor and to the base of a transistor of a voltage inverting unit whose output controls the power branch (L).

25. A method according to claim 24, wherein the step of electrically loading includes controlling the controlled resistance component (24, 25, 37, 43) in the power branch (L) such that the voltage drop across the controlled resistance component is equivalent to the difference between the threshold value ($V_{Bmax}$) and the voltage drop across the resistance component (38, 39, 44, 45) connected in series with the controlled resistance component.

26. A method according to claim 25, wherein the step of continuously controlling the system voltage includes: in the event of an overvoltage, controlling the system voltage across a temperature range of −20° C. to 85° C. to the constant threshold value ($V_{Bmax}$).

27. A method according to claim 25, wherein the step of continuously controlling the system voltage includes: in the event of an over voltage, controlling the system voltage across a temperature range of −40° C. to 125° C. to the constant threshold value ($V_{Bmax}$).

* * * * *